(12) United States Patent
Fung

(10) Patent No.: US 7,372,640 B2
(45) Date of Patent: May 13, 2008

(54) ENHANCED COLOR CONTRAST LENS

(75) Inventor: Chow Tak Fung, Kowloon (HK)

(73) Assignee: Easy Power Ltd., Kowloon (HK)

( * ) Notice: Subject to any disclaimer, the term of this patent is extended or adjusted under 35 U.S.C. 154(b) by 0 days.

(21) Appl. No.: 11/655,469

(22) Filed: Jan. 19, 2007

(65) Prior Publication Data

US 2007/0171537 A1 Jul. 26, 2007

(30) Foreign Application Priority Data

Jan. 20, 2006 (CN) .................... 2006 1 0005982

(51) Int. Cl.
*G02B 3/00* (2006.01)
*G02B 27/14* (2006.01)
(52) U.S. Cl. ...................... 359/722; 359/634
(58) Field of Classification Search .......... 359/722, 359/723
See application file for complete search history.

(56) References Cited

U.S. PATENT DOCUMENTS 6,793,339 B1 * 9/2004 Yip et al. ................ 351/163

2002/0126256 A1 * 9/2002 Larson ..................... 351/159

* cited by examiner

*Primary Examiner*—Jordan Schwartz
*Assistant Examiner*—James C Jones
(74) *Attorney, Agent, or Firm*—Law Office of Sergei Orel, LLC

(57) ABSTRACT

A color contrast enhancing lens made from adhering two different lenses and a membrane together. It includes a color enhancing lens whose specific component will selectively absorb the yellow light in the visible spectrum, which enhances the user vision by enhancing the distinction between red and green. It also includes an ultraviolet blocking lens whose special compounds will absorb the majority of violet light and a part of blue light. It also includes a light polarization membrane whose special structure can reduce strong light. It can also absorb the majority of violet light and keep a low transmission rate of blue light, thus reduced the retina injury caused by overexposure to blue light. It can also block the invisible ultraviolet and reduce strong light. So while the users' eyes are protected, they can also enjoy their view.

5 Claims, 3 Drawing Sheets

ENHANCED COLOR CONTRAST LENS

TECHNICAL FIELD

This invention is about a type of lens, to be specific, it is a lens that can enhance the color contrast and its manufacturing technology. In addition to enhancing the color contrast, this lens can screen out invisible ultraviolet light and reduce reflection and blue light.

BACKGROUND TECHNOLOGY

Color contrast enhancing lenses are made from putting different glass lenses together by using glue. Different lenses have different function and component. Thus the combined lenses can enhance color contrast, block ultra violet, and reduce reflection and blue light. In the current technology field there are many similar color contrast enhancing lenses. Most of them can block ultraviolet and reduce some strong light. But when coming to enhancing color contrast, since the component compounds are different, they do not have the ability to absorb the blue and yellow wavelength in the spectrum. Thus while there is no improvement in distinguishing red and green, it is also possible to hurt the retina because of the blue light exposure. Besides, the lens of similar type does not have good ultraviolet blocking. Thus the users' eyes are not effectively protected.

SUMMARY OF THE INVENTION

Based on the abovementioned problem, the invention aims at providing a lens that can enhance color contrast and its manufacturing technology. Adhesive is used to stick two lenses of different function as well as a polarization membrane. One of the lenses can absorb blue and yellow wavelength in the spectrum. It contains specific content so that the users can distinguish red and green better and enhance the vision. It can also reduce the possibility of retina injury caused by overexposure to blue light. Besides, the lens that can absorb ultraviolet and the membrane that can polarize the light can also block ultraviolet and reduce strong light. Thus the uses' eyes are protected while they enjoy the vision.

To achieve these goals, this invention provides a lens that can enhance color contrast and its manufacturing technology. It contains an adhesive without any optical character. It also contains a color contrast enhancement lens, which contains 9% neodymium and 3% praseodymium. Thus this lens greatly reduced the penetration of blue radiation, which includes the blue wavelength portion (380 nanometer to 500 nanometer) of the visible spectrum. It also enhances the major color vision on the key wavelength on the visible spectrum, i.e., it enhanced the contrast of red and green. This invention also contains an ultraviolet blocking lens. It has crystal bromine inside to block the invisible ultra violet. The invention also includes a light polarization membrane in between. Its polymer structure of poly-ethylene-ethanol will polarize all light passing through, thus reduce strong sunlight and reflection.

Finally, this invention uses the combination of different lenses and membrane to protect users' vision as well as improve the sight.

DETAILED ILLUSTRATION

Figure 1:
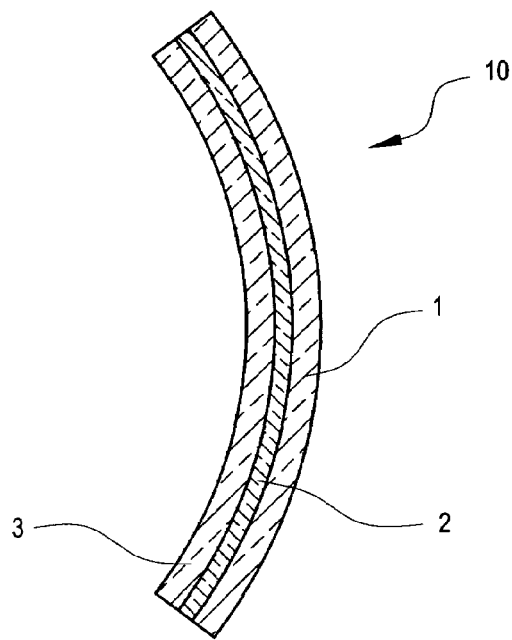
FIG. 1 is the side profile of this color contrast enhancing lens.

Please refer to FIG. 1 first. The Figure shows a side profile of this color contrast enhancing lens 10 of this invention. It includes contains a color contrast enhancement lens 1. This color contrast enhancement lens 1 contains 9% neodymium and 3% praseodymium. It greatly reduces the penetration of blue radiation, which includes the blue wavelength portion (380 nanometer to 500 nanometer) of the visible spectrum. It also enhanced the major color vision on the key wavelength on the visible spectrum, i.e., it enhanced the contrast of red and green. The manufacturing process is to abrade the raw material to a thin membrane about the right arc of the thickness of about 0.8+/−0.05 micrometer. Then dip it into a liquid of 99.5% potassium nitrate and 0.5% silicic acid for about 16+/−2 hours enhancement. Thus the color contrast enhancement lens 1 is done. There is also an ultraviolet blocking lens 3. This lens 3 contains crystal bromine processed by auxiliary heating treatment. Thus lens 3 can completely block the invisible ultraviolet and part of the blue light. The manufacturing process is to abrade the raw material to a thin membrane about the right arc of the thickness of about 1+/−0.05 micrometer. Then dip it into a liquid of 99.5% potassium nitrate and 0.5% silicic acid for about 16+/−2 hours enhancement. Thus the ultraviolet blocking lens 3 is completed. In between the two lenses is a light polarization membrane 2. Its polymer structure of poly-ethylene-ethanol will polarize all light passing through, thus reduce strong sunlight and reflection. The manufacturing process is to place the raw material in the appropriate temperature and humidity to make it extensible. Then it is stretched on the mould plate to about the right arc. When it is dry, it becomes the concaving light polarization membrane 2, which fits into the color contrast enhancement lens 1 and the ultraviolet blocking lens 3. The invention also includes an adhesive that has no optical character. This adhesive is made from three different optical epoxy resins. It is smeared to the surface of the abovementioned lenses and membrane, making sure there is no bubble between the layers. After about eight hours of solidification, the color contrast enhancement lens 1, the light polarization membrane 2, and the ultraviolet blocking lens 3 are solidly attached with each other.

Figure 2:
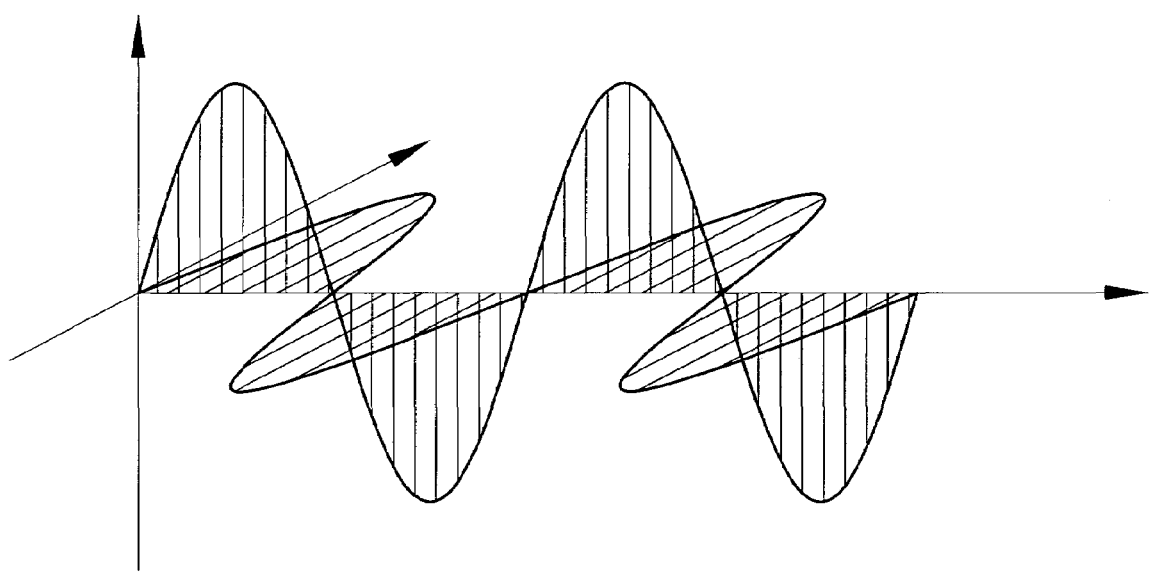
FIG. 2 is the illustration of light passing through the lens.

Please refer to FIG. 2 next. It shows the activity of light when passed through the layers. It shows the light passes through as two sections of light at right angles.

Figure 3:
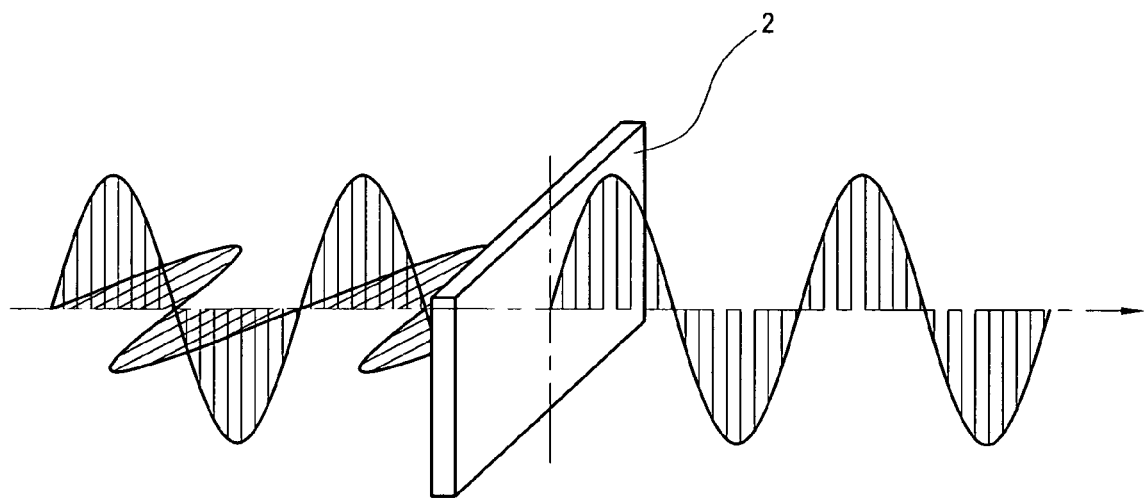
FIG. 3 is the illustration of light after passing through polarization membrane.

Please refer to FIG. 3 next. It shows the light before and after the light passes through the light polarization membrane 2. In the center of the Figure is the light polarization membrane 2. The non-polarized light coming in as two light waves at right angles, as shown in FIG. 2 by two double head arrows. After the non-polarized light passes through the light polarization membrane 2, the wave of one direction will be absorbed by the light polarization membrane 2. Only the straight section shown in FIG. 3 is left. Thus the irritation and injury to the eyes caused by strong sunlight and reflection will be reduced.

Figure 4:
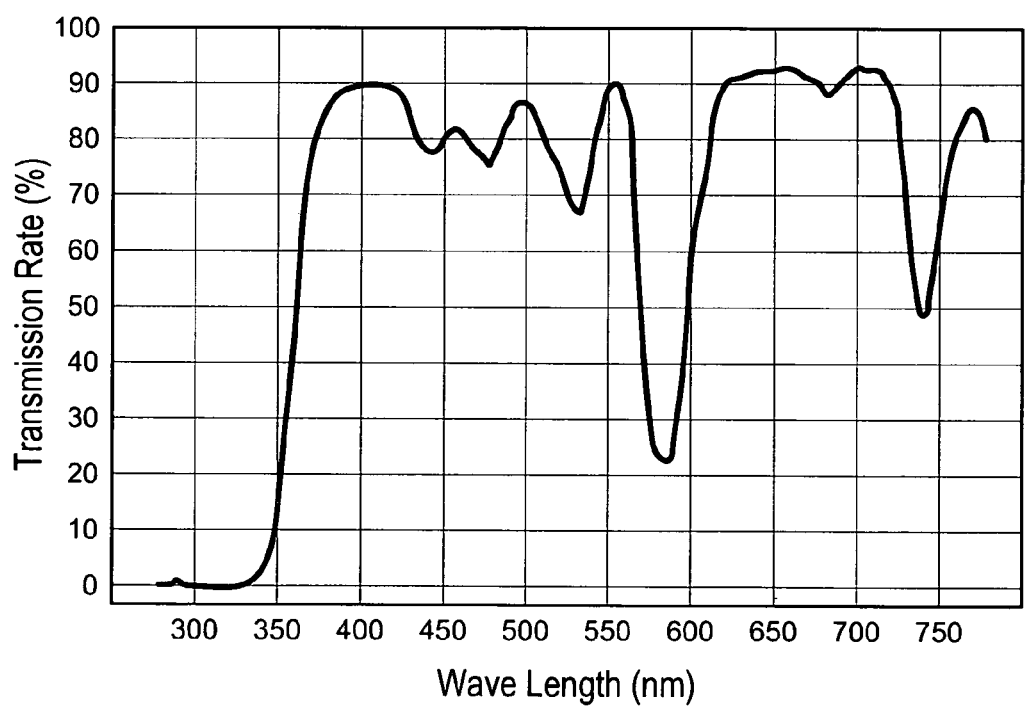
FIG. 4 is the comparison of transmittance of this color contrast enhancing lens against the wavelength.

FIG. 4 shows the comparison of transmittance of this color contrast enhancing lens 1 against the wavelength. Please note that this lens 1 reduced the transmittance of some important wavelengths, such as 530 nanometer, 570 nanometer, and 740 nanometer. But the transmittance of 490 nanometer, 550 nanometer, 650 nanometer, and 710 nanometer are still quite high, that is above 75% and preferably between 80 to 95% or more. Thus the vision effect of key colors on the visible spectrum is enhanced, i.e., the contrast of red and green is enhanced.

Figure 5:
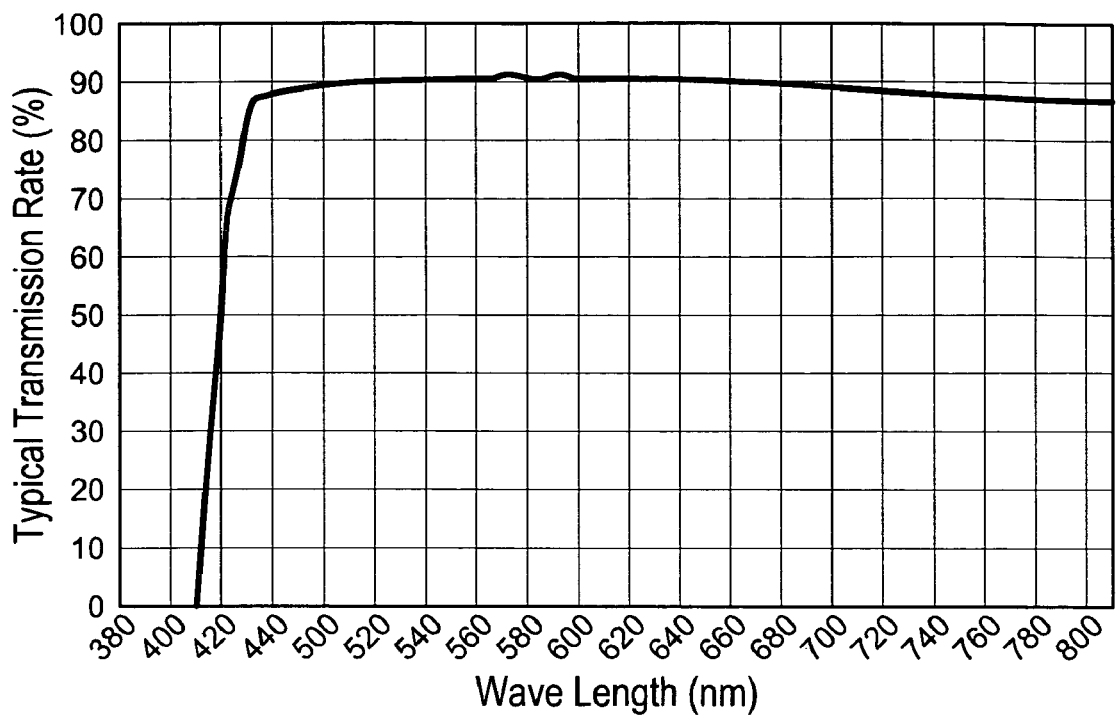
FIG. 5 is the comparison of transmittance of this ultraviolet blocking lens against the wavelength.

FIG. 5 is the comparison of transmittance of this ultraviolet blocking lens 3 against the wavelength. Please note this lens 3 is an optical lens. It contains crystal bromine processed by auxiliary heating treatment to achieve this function. It can absorb almost all, that is at least 85% and preferably 90% to 99%, light whose wavelength is 415 nanometer and under. Since the wavelength of ultraviolet is from 280 nanometer to 380 nanometer, the lens 3 can absorb almost all ultraviolet light that is harmful to human eyes.

Figure 6:
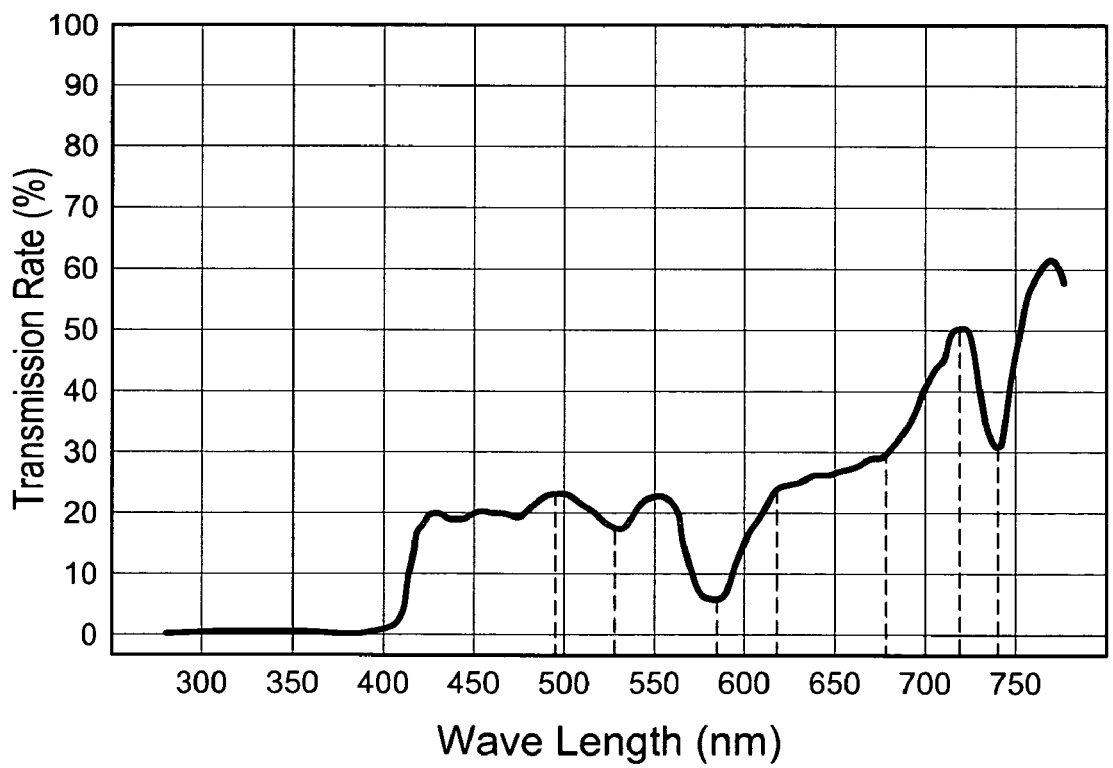
FIG. 6 is the comparison of transmittance of this color contrast enhancing lens as a whole against the wavelength.

Finally please refer to FIG. 6. It shows the comparison of transmittance of this color contrast enhancing lens 10 as a whole against the wavelength. It shows the optical character after the color contrast enhancement lens 1, the light polarization membrane 2, and the ultraviolet blocking lens 3 are combined together. Lens 1 reduced the transmittance of several key wavelengths such as 510 nanometer, 570 nanometer, and 740 nanometer. But the transmittance of 490 nanometer, 550 nanometer, 650 nanometer, and 710 nanometer are still high, that is at least 20% and in this embodiment between 23% and 45%. Thus the contrast of red and green is enhanced. Lens 3 can absorb almost all light whose wavelength is 415 nanometer and under, thus absorb almost all ultraviolet light that is harmful to human eyes. And its comprehensive effect will also absorb the majority, i.e., at least 75% and preferably 80% or more, of violet (380 nanometer to 424 nanometer) as well as keep the transmittance of blue (424 nanometer to 491 nanometer) at a low level, i.e, about 20%.

The data shown in 6 reveal the following transmittances:

530 nm 17%

490 nm 23%

550 nm 23%

570 nm 8%

650 nm 27%

710 nm 45%

740 nm 31%

The goal of this invention is to provide a color contrast enhancing lens 10, using adhesive to combine two lenses 1 and 3 with different functionality as well as a light polarization membrane 2. The specific compound makes it absorb specific yellow wavelength in the visible spectrum. Thus the user can better distinguish red and green. Besides, it also absorbs the majority of violet light and keeps the transmittance of blue light at a low level. In addition to it, the ultraviolet blocking lens and the light polarization membrane can block the invisible ultraviolet and reduce strong sunlight. Thus the users' vision is protected, and they can enjoy the scene better.

Worthy mention is, the current products usually use regular optical glass, whose main component is silica silicon, sodium, potassium, iron, and boron.

| The regular optical glass contains: | |
|---|---|
| Silica silicon | 68.3% |
| Aluminum | 2% |
| Sodium | 8% |
| Potassium | 9.4% |
| Zinc | 3.5% |
| Calcium | 8.4% |

Melt it and anneal under 1500 degree Celsius.

This invention preferably uses a high quality transparent protection glass that can cut ultraviolet significantly. An example of a suitable glass is WU563 from Pilkington Special Glass Limited of Britain. It has a reduced amount of silica silicon, sodium, potassium, and iron. But it has more bromine, copper, stibium, and aluminum. This high quality optical glass is exposed to auxiliary heating treatment. Crystal bromine is grown inside the glass. This crystal provides the unique character of absorbing all wavelengths up to 415 nm when the thickness is 2.0 nm, and all wavelengths up to 410 nm when the thickness is 1.0 nm. We refer to glass exhibiting this character as a UV415 glass.

Below are the components and the manufacturing process of a UV415 ultraviolet protection glass.

| UV415 white glass contains: | |
|---|---|
| Silica silicon | 58.4% |
| Aluminum | 3.6% |
| Sodium | 10.18% |
| Potassium | 0.65% |
| Boron | 23% |
| Copper | 0.5% |
| Titanium | 0.2% |
| Stibium | 1.5% |

Melt it and anneal under 1280 degree Celsius. Anneal to 650 degree Celsius to growth Bromine. Thus the unique UV415 character is formed.

What is claimed:

1. A lens that can enhance color contrast comprising:

A color contrast enhancing lens which selectively absorbs some specific wavelengths to enhance the color effect in the visible spectrum by enhancing the contrast between red and green;

An ultraviolet blocking lens to block invisible ultraviolet light;

A layer of light polarization membrane to polarize light to reduce strong sunlight and reflection, said layer located between the color contrast enhancing lens and the ultraviolet blocking lens; and An adhesive that has no optical power to adhere the abovementioned color enhancing lens, ultraviolet blocking lens, and polarization membrane together, Wherein said color contrast enhancing lens contains about 9% neodymium and 3% praseodymium.

2. A lens that can enhance color contrast comprising:

A color contrast enhancing lens which selectively absorbs some specific wavelengths to enhance the color effect in the visible spectrum by enhancing the contrast between red and green;

An ultraviolet blocking lens to block invisible ultraviolet light;

A layer of light polarization membrane to polarize light to reduce strong sunlight and reflection, said layer located between the color contrast enhancing lens and the ultraviolet blocking lens; and An adhesive that has no optical power to adhere the abovementioned color enhancing lens, ultraviolet blocking lens, and polarization membrane together, Wherein said color contrast enhancing lens which is made by abrading the raw material to a thin membrane about the right arc of the thickness of about 0.8+/−0.05 micrometer, dipping the abraded membrane into a liquid of 99.5% potassium nitrate and 0.5% silicic acid for about 14 to 18 hours.

3. A lens that can enhance color contrast comprising:

A color contrast enhancing lens which selectively absorbs some specific wavelengths to enhance the color effect in the visible spectrum by enhancing the contrast between red and green;

An ultraviolet blocking lens to block invisible ultraviolet light;

A layer of light polarization membrane to polarize light to reduce strong sunlight and reflection, said layer located between the color contrast enhancing lens and the ultraviolet blocking lens; and An adhesive that has no optical power to adhere the abovementioned color enhancing lens, ultraviolet blocking lens, and polarization membrane together, Wherein said ultraviolet blocking lens has crystal bromine inside, said crystal bromide being generated via an auxiliary heating treatment.

4. A lens that can enhance color contrast comprising:

A color contrast enhancing lens which selectively absorbs some specific wavelengths to enhance the color effect in the visible spectrum by enhancing the contrast between red and green;

An ultraviolet blocking lens to block invisible ultraviolet light;

A layer of light polarization membrane to polarize light to reduce strong sunlight and reflection, said layer located between the color contrast enhancing lens and the ultraviolet blocking lens; and An adhesive that has no optical power to adhere the abovementioned color enhancing lens, ultraviolet blocking lens, and polarization membrane together, Wherein said ultraviolet blocking lens is made by abrading the raw material to a thin membrane about the right arc of the thickness of about 1+/−0.05 micrometer, dipping the abraded membrane into a liquid of 99.5% potassium nitrate and 0.5% silicic acid for about 14-18 hours.

5. A lens that can enhance color contrast comprising:

A color contrast enhancing lens which selectively absorbs some specific wavelengths to enhance the color effect in the visible spectrum by enhancing the contrast between red and green;

An ultraviolet blocking lens to block invisible ultraviolet light;

A layer of light polarization membrane to polarize light to reduce strong sunlight and reflection, said layer located between the color contrast enhancing lens and the ultraviolet blocking lens; and An adhesive that has no optical power to adhere the abovementioned color enhancing lens, ultraviolet blocking lens, and polarization membrane together, Wherein said light polarization membrane has a polymer structure of poly-ethylene-ethanol.

* * * * *